US011631119B2

(12) United States Patent
Hadden et al.

(10) Patent No.: US 11,631,119 B2
(45) Date of Patent: Apr. 18, 2023

(54) ELECTRONIC PRODUCT RECOGNITION

(71) Applicant: TARGET BRANDS, INC., Minneapolis, MN (US)

(72) Inventors: Corey Hadden, Minneapolis, MN (US); Nicholas Eggert, Minneapolis, MN (US); Ryan Siskind, Minneapolis, MN (US); Edgar Cobos, Minneapolis, MN (US); Stephen Radachy, Minneapolis, MN (US); Rachel Alderman, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 684 days.

(21) Appl. No.: 16/739,603

(22) Filed: Jan. 10, 2020

(65) Prior Publication Data

US 2020/0226656 A1 Jul. 16, 2020

Related U.S. Application Data

(60) Provisional application No. 62/791,389, filed on Jan. 11, 2019.

(51) Int. Cl.
*G06Q 30/00* (2023.01)
*G06Q 30/0601* (2023.01)
(Continued)

(52) U.S. Cl.
CPC ........... *G06Q 30/0623* (2013.01); *G06T 7/12* (2017.01); *G06V 20/20* (2022.01); *G06V 20/52* (2022.01); *G06V 30/153* (2022.01)

(58) Field of Classification Search
CPC ...................................................... G06Q 30/00
See application file for complete search history.

(56) References Cited

U.S. PATENT DOCUMENTS 8,432,414 B2 4/2013 Vetterli et al.
8,810,598 B2 8/2014 Soon-Shiong
(Continued)

FOREIGN PATENT DOCUMENTS

CA 3037201 3/2018
CN 105022773 5/2019
JP 2014-530390 11/2014

OTHER PUBLICATIONS

Tonioni, Alessio et al, "Product recognition in store shelves as a sub-graph isomorphism problem" Springer Link, dated Oct. 13, 2017. (Year: 2017).*

(Continued)

*Primary Examiner* — Mark A Fadok
(74) *Attorney, Agent, or Firm* — Hamre, Schumann, Mueller & Larson, P.C.

(57) ABSTRACT

Methods and systems for identifying one or more products in an electronic image are disclosed. The computer-implemented method to electronically recognize a product in an electronic image captured via an electronic mobile device is disclosed. The method includes receiving, by a server, a video stream from a camera of the electronic mobile device, the video stream including a plurality of frames. The server selects at least one of the plurality of frames from the video stream, the at least one of the plurality of frames from the video stream being selected is a captured image. The server segments a plurality of products in the captured image into a plurality of segments. The server performs an image recognition using each of the plurality of segments to identify the product in each of the plurality of segments. One or more recognized products identified in the image recognition is outputted by the server.

19 Claims, 6 Drawing Sheets

(51) Int. Cl.
*G06T 7/12* (2017.01)
*G06V 20/20* (2022.01)
*G06V 30/148* (2022.01)
*G06V 20/52* (2022.01)

(56) References Cited

U.S. PATENT DOCUMENTS

| | | | |
|---|---|---|---|
| 9,204,131 | B2 | 12/2015 | Arrasvuori et al. |
| 9,443,164 | B2 | 9/2016 | Sulc et al. |
| 9,519,924 | B2 | 12/2016 | Calman et al. |
| 9,665,983 | B2 | 5/2017 | Spivack |
| 9,689,688 | B2 | 6/2017 | Sasao et al. |
| 9,690,991 | B2 | 6/2017 | Wnuk et al. |
| 9,824,501 | B2 | 11/2017 | Soon-Shiong |
| 11,568,356 | B1 * | 1/2023 | Rochon ............... G06T 19/006 |
| 2012/0089470 | A1 | 4/2012 | Barnes, Jr. |
| 2013/0083003 | A1 | 4/2013 | Perez et al. |
| 2015/0012426 | A1 | 1/2015 | Purves et al. |
| 2015/0058229 | A1 | 2/2015 | Wiacek et al. |
| 2015/0088701 | A1 * | 3/2015 | Desmarais ........... G06Q 10/087 |
| | | | 705/28 |
| 2015/0302517 | A1 | 10/2015 | Spivack et al. |
| 2016/0209648 | A1 | 7/2016 | Haddick et al. |
| 2016/0350708 | A1 * | 12/2016 | Jones .................. G06Q 10/087 |
| 2016/0364788 | A1 | 12/2016 | Jo et al. |
| 2017/0103440 | A1 | 4/2017 | Xing et al. |
| 2017/0140653 | A9 | 5/2017 | Sasao et al. |
| 2017/0249491 | A1 | 8/2017 | MacIntosh et al. |
| 2018/0005035 | A1 * | 1/2018 | Bogolea ................ B25J 11/008 |
| 2018/0040168 | A1 | 2/2018 | Soon-Shiong |
| 2019/0149725 | A1 | 5/2019 | Adato et al. |

OTHER PUBLICATIONS

US Non-final Office Action, issued in the U.S. Appl. No. 16/739,752, dated Nov. 23, 2021, 14 pages.

* cited by examiner

ELECTRONIC PRODUCT RECOGNITION

FIELD

This disclosure relates generally to electronic image recognition. More specifically, this disclosure relates to electronic image recognition of an image including one or more products available for purchase from a retailer using an electronic device in a retail environment.

BACKGROUND

Retail shopping continues to evolve as electronic mobile devices develop additional functionality. Consumers can now use a camera on the electronic mobile device to, for example, scan a barcode on a product to learn more information about that product. Augmented reality can be utilized to superimpose information onto a display of the consumer's electronic mobile device to enable virtual interactions with the real-world environment.

Improved ways of identifying the products captured from the consumer's electronic device are desirable.

SUMMARY

This disclosure relates generally to electronic image recognition. More specifically, this disclosure relates to electronic image recognition of an image including one or more products available for purchase from a retailer using an electronic device in a retail environment.

In an embodiment, a product can be recognized within at or about two seconds and with confidence of at or about 95% or greater.

In an embodiment, the electronic product recognition can be performed in real-time or substantially real-time.

A system is disclosed. The system includes a server having a processor and a memory; a communication network; and a database in electronic communication with the server via the communication network. The server includes an electronic product recognizer that receives a video stream from a camera of an electronic mobile device, the video stream including a plurality of frames. The server selects at least one of the plurality of frames from the video stream, the at least one of the plurality of frames from the video stream being selected is a captured image. The server segments a plurality of products in the electronic image into a plurality of segments. The server performs an image recognition using each of the plurality of segments to identify the product in each of the plurality of segments. The server outputs one or more recognized products identified in the image recognition.

A computer-implemented method to electronically recognize a product in an electronic image captured via an electronic mobile device is disclosed. The method includes receiving, by a server, a video stream from a camera of the electronic mobile device, the video stream including a plurality of frames. The server selects at least one of the plurality of frames from the video stream, the at least one of the plurality of frames from the video stream being selected is a captured image. The server segments a plurality of products in the captured image into a plurality of segments. The server performs an image recognition using each of the plurality of segments to identify the product in each of the plurality of segments. The server outputs one or more recognized products identified in the image recognition.

A system is disclosed. The system includes a server having a processor and a memory; a communication network; and a database in electronic communication with the server via the communication network. The server includes an electronic product recognizer that receives a segmented image from a camera of an electronic mobile device, the segmented image including a plurality of segments. The server performs an image recognition using each of the plurality of segments to identify the product in each of the plurality of segments. The server outputs one or more recognized products identified in the image recognition.

A computer-implemented method to electronically recognize a product in an electronic image captured via an electronic mobile device is disclosed. The method includes receiving, by a server, a segmented image from a camera of the electronic mobile device, the video stream including a plurality of segments. The method further includes performing an image recognition using each of the plurality of segments to identify the product in each of the plurality of segments. The server outputs one or more recognized products identified in the image recognition.

BRIEF DESCRIPTION OF THE DRAWINGS

References are made to the accompanying drawings that form a part of this disclosure and which illustrate embodiments in which the systems and methods described in this specification can be practiced.

Like reference numbers represent like parts throughout.

DETAILED DESCRIPTION

Figure 1:
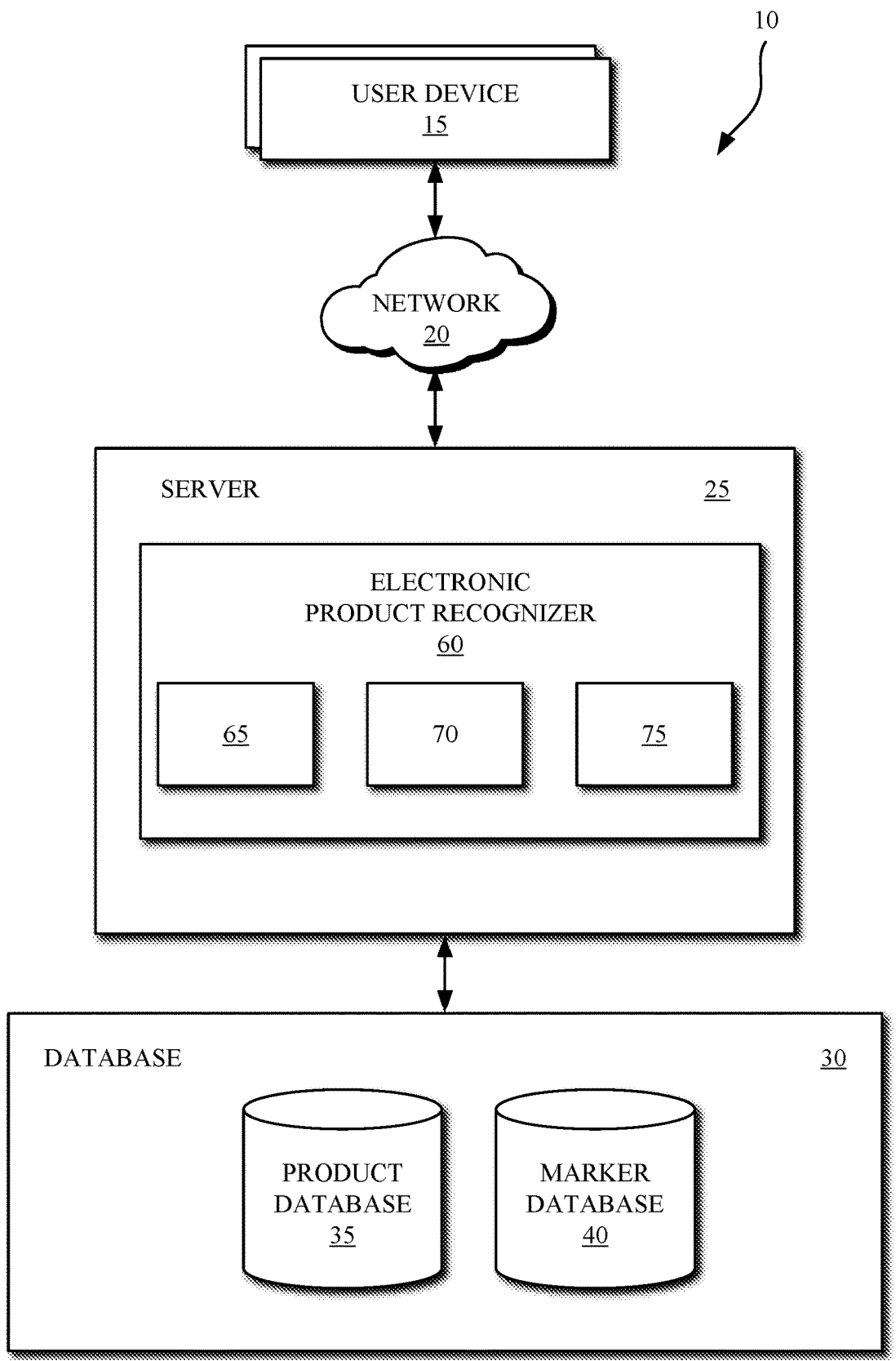
FIG. 1 is a schematic diagram of a system for implementing the electronic product recognition systems and methods described in this specification, according to an embodiment.

This disclosure relates generally to electronic image recognition. More specifically, this disclosure relates to electronic image recognition of an image including one or more products available for purchase from a retailer using an electronic device in a retail environment.

Augmented reality generally refers to technology in which a computer-generated image is superimposed on a display device of a consumer's electronic device (e.g., an electronic mobile device, etc.) to provide a composite image that includes the consumer's view of the real world as well as the superimposed image. In today's retail environment, augmented reality is being utilized to superimpose information about one or more products sold in a retailer's store to provide the consumer with additional information about the products. Success of the augmented reality application is based at least in part on the ability of the retailer to identify what products are in the consumer's view of the real world (through the electronic mobile device).

Image recognition currently may be limited to recognizing a single type of object at a time. For example, current image recognition typically is applied in recognizing a single product. However, retail stores may have thousands of products arranged on a shelf including a number of similar products. For a consumer to utilize current image recognition, the consumer must position the product and wait for the image recognition to complete. This can be slow and inconvenient for the consumer, especially in instances where the consumer would like to recognize more than one product. Improved methods of recognizing a plurality of products accurately and quickly are desirable.

In an embodiment, a retailer can limit a scope of the image recognition based on the products that the retailer sells. Limiting the scope of the image recognition can reduce an overall computational load in completing the image recognition and increase a speed at which the image recognition is completed.

Disclosed herein are electronic product recognition methods and systems in which an electronic image or images are received from an electronic mobile device and the electronic images are utilized to identify the product or products included in the electronic image and provide product information relevant to the product or products identified in the electronic image(s).

An electronic product recognizer can receive the electronic images from a camera on an electronic mobile device and generate a list of recognized products. The list of recognized products permits the consumer to interact with the recognized products via the mobile device.

As described in further detail below, in one embodiment, a consumer uses a camera on an electronic mobile device, such as a smartphone, tablet device, wearable device, or the like, to capture an electronic image of a product or a plurality of products using an application that resides on the electronic mobile device. The product or products can then be recognized. A list of products as recognized (e.g., recognized products) can be generated and a sticker or other window may be displayed on the display screen of the electronic mobile device to enable the consumer to, for example, learn more about the products, shop the products and, if desired, purchase one or more of the products. The list of products from the image may generally be referred to as recognized products herein.

The product or products can be any type of product that the retailer sells. The products are products that are available for sale within a retail store. The products may be available for sale online (e.g., on a website of the retail store, etc.) or that are available for sale via another sales channel. In an embodiment, products in the electronic images that are not for sale may be excluded from the image recognition. For example, products for promotional or other purposes that are intended to permit consumers to learn more about a product, but not necessarily to permit the consumer to be able to purchase the product, may be excluded from the image recognition.

As used herein, an electronic mobile device is any device that can be used to electronically capture an image and that can display a list of recognized products on a display screen that is connected to or associated with the electronic mobile device.

Examples of electronic mobile devices include, but are not limited to, mobile phones, smartphones, tablet-style devices, wearable devices, laptop computers, and the like. In one embodiment, the electronic mobile device includes at least a camera and some means to control the camera. The electronic mobile device also includes a display screen and some means to select products displayed on the display screen, and some means to send and receive data communications as described further below.

Cameras on most current electronic mobile devices are capable of capturing photographs and/or video. In an embodiment, the camera may be capable of capturing an image without the user performing an action (e.g., pressing a shutter button) to cause an image to be taken. Any type of image capture technology on an electronic mobile device that is capable of capturing an image of one or more products can be used.

As used herein, to capture or capturing an image refers to the act of obtaining an image of the products using the camera or other image capture technology of the electronic mobile device. Obtaining the image of the products may also be referred to as imaging the products. A captured image is an image of the products that has been captured by the electronic mobile device. The products from which a captured image has been obtained may be referred to as the imaged products. It is to be appreciated that capturing an image of the products includes capturing an image of the entire product as well as capturing an image of a portion of the product.

As used herein, a recognized product, or a list of recognized products includes those products identified from a captured image.

As used herein, optical character recognition (OCR) includes an electronic conversion of an image of text into machine-readable text.

As used herein, histogram of oriented gradients includes a technique in which occurrences of gradient orientation in localized portions of an image are counted.

As used herein, edge detection includes identifying locations within an electronic image in which image brightness abruptly changes.

As used herein, a marker includes an electronic visual cue which triggers display of electronic information.

As used herein, a planogram includes an electronic representation of products within a retail store.

In an embodiment, a product can be recognized within at or about two seconds and with confidence of at or about 95% or greater.

In an embodiment, the product recognition occurs in real-time or substantially real-time.

In an embodiment, the one or more products can be recognized regardless of location. For example, the products can be arranged on a shelf, in a cart, in a consumer's hand, or the like.

FIG. 1 is a schematic diagram of a system 10 for implementing the electronic product recognition systems and methods described in this specification, according to an embodiment. The system 10 can identify one or more products captured in a real world scene from a user device 15. In an embodiment, the system 10 can be utilized in a retail store environment to enable a consumer to capture an image of one or more products located in the retail store while, for example, the consumer is browsing the retail store.

The system 10 includes a server 25 in electronic communication with a plurality of user devices 15 via a network 20. The server 25 includes an electronic product recognizer 60 that can receive a captured image from the user devices 15. The electronic product recognizer 60 can identify one or more products included in the captured image received from the user devices 15. The electronic product recognizer 60 can make the product information available to the system 10, as described in this Specification available, to the user devices 15 via the network 20. In an embodiment, the electronic product recognizer 60 can be configured to generate one or more messages to a user that includes the product information or a message with details about the product.

The electronic product recognizer 60 can include a plurality of modules utilized in the identification of the products within the captured image. In the illustrated embodiment, three modules 65-75 are shown. It will be appreciated that the number of modules can vary within the scope of this disclosure.

In the embodiment shown in FIG. 1, the electronic product recognizer 60 includes a marker detector 65, an optical character recognizer 70, and a logo recognizer 75. In an embodiment, the one or more additional modules can include an edge detector, a planogram identifier, a histogram of oriented gradient detector, a global positioning system (GPS) recognizer, an in-store positioning system (IPS), a color recognizer, an artificial neural network, or the like.

The marker detector 65 can identify one or more known markers in a captured image. A marker generally includes an electronic visual cue which triggers display of electronic information. For example, a marker can include a barcode on a shelf, a tag or other aspect of a display which is included in the captured image, an aspect of product packaging, or the like.

The optical character recognizer 70 can identify one or more text characters in the captured image. Optical character recognition (OCR) systems are generally well-known and the optical character recognizer 70 functions according to these generally known principles.

The logo recognizer 75 can identify a logo or brand identifier present on the one or more products included in the captured image.

In an embodiment, the network 20 may be representative of the Internet. In an embodiment, the network 20 can include a local area network (LAN), a wide area network (WAN), a wireless network, a cellular data network, suitable combinations thereof, or the like. Aspects of the network 20 can be the same as or similar to aspects of the network 540 as shown and described in accordance with FIG. 5 below. In an embodiment, the user devices 15 may be located on premises of a retail store of the retailer and the server 25 and database 30 located on premises as well. In an embodiment, one or more components of the server 25 or the database 30 may be located off premises.

Examples of the user devices 15 include, but are not limited to, a mobile device (e.g., a smartphone, a personal digital assistant (PDA), a tablet-style device, etc.), a wearable mobile device (e.g., a smart watch, a head wearable device, etc.), or the like. The user devices 15 generally include a display device and an input device. Examples of the display devices for the user devices 15 include, but are not limited to, a mobile device screen, a tablet screen, a wearable mobile device screen, or the like. Examples of the input devices for the user devices 15 include, but are not limited to, a keyboard, a button, a voice command, a proximity sensor, a touch sensor, an ocular sensing device for determining an input based on eye movements (e.g., scrolling based on an eye movement), suitable combinations thereof, or the like. Aspects of the user devices 15 can be the same as or similar to aspects of the user devices 501 as shown and described in accordance with FIG. 5 below.

The server 25 is in electronic communication with database 30. The database 30 can include a variety of data related to the products being recognized by the electronic product recognizer 60.

In an embodiment, the database 30 can include one or more databases. For example the database 30 shown in FIG. 1 includes a product database 35 and a marker database 40.

The product database 35 can generally store information related to all of the products available from the retailer. In an embodiment in which the server 25 and the database 30 are stored on premises of one of the retailer's stores, the product database 35 can include information that is unique to the particular store. For example, a first retail store of the retailer may sell 10,000 products and a second retail store may sell 10,000 products where at least one of the products sold at the first retail store is not available at the second retail store, or vice versa. In such a scenario, the product database 35 on premises of the first retail store may include different information than the product database 35 on premises of the second retail store. It will be appreciated that in an embodiment, even if the retailer sells different products at different stores, the product database 35 at each of the retail stores may include the same information (including items not sold at a particular store) for simplicity of managing the data in the product database 35.

The product database 35 may be connected to an external network so that updates can be made on a periodic basis to the information stored in the product database 35. For example, on a daily, weekly, etc., basis, the product database 35 may be updated to remove product information that is associated with a product the retailer no longer sells, to add product information for a new product that the retailer is beginning to sell, to modify information about products the retailer currently sells, or the like. It will be appreciated that updating the product database 35 can also be updated as needed (e.g., on an irregular basis).

In general, the product database 35 may include any information that is descriptive of the product. For example, the product database 35 can include a unique identifier for the product, the product name, product type, price, etc. Additionally, the product database 35 can include information relevant to the identification of the product in a captured image. For example, the product database 35 can include color information, label text, product location in the store, nearby products, or the like.

The marker database 40 includes markers associated with products available in a retailer's store.

It will be appreciated that the above databases are examples. Additional databases can be included. One or more of the databases can be combined into a single database. For example, in an embodiment, the product database 35 and the marker database 40 can be combined into a single database (not shown).

It is to be appreciated that various roles of user devices 15, server 25, and database 30 may be distributed among the devices in the system 10. For example, the electronic product recognizer 60 can be partially or entirely included on the user devices 15 in, for example, an application or the like. Similarly, the database 30 can be maintained on the server 25.

In general, the system 10 is disposed physically at the retail store of the retailer. That is, eliminating communication between the user devices 15, server 25, and database 30 occurring via a network remote from the retail store may increase a performance and response time of the system 10. In an embodiment, the server 25 and database 30 may be physically located at the retail store, but may be connected in communication with an external network so that, for example, updates may be provided on an ongoing basis (e.g., nightly, weekly, etc.).

Figure 2A:
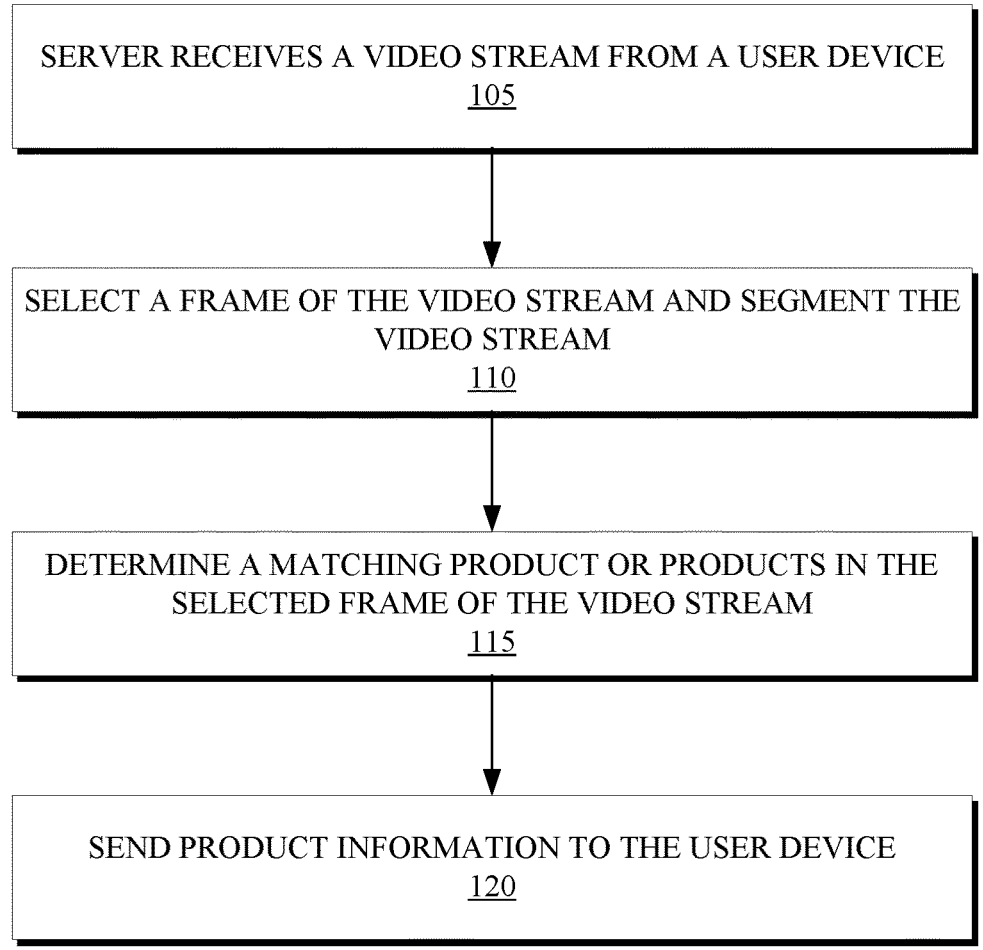
FIG. 2A is a flowchart of a method for recognizing a plurality of products within a captured image, according to an embodiment.
Figure 2B:
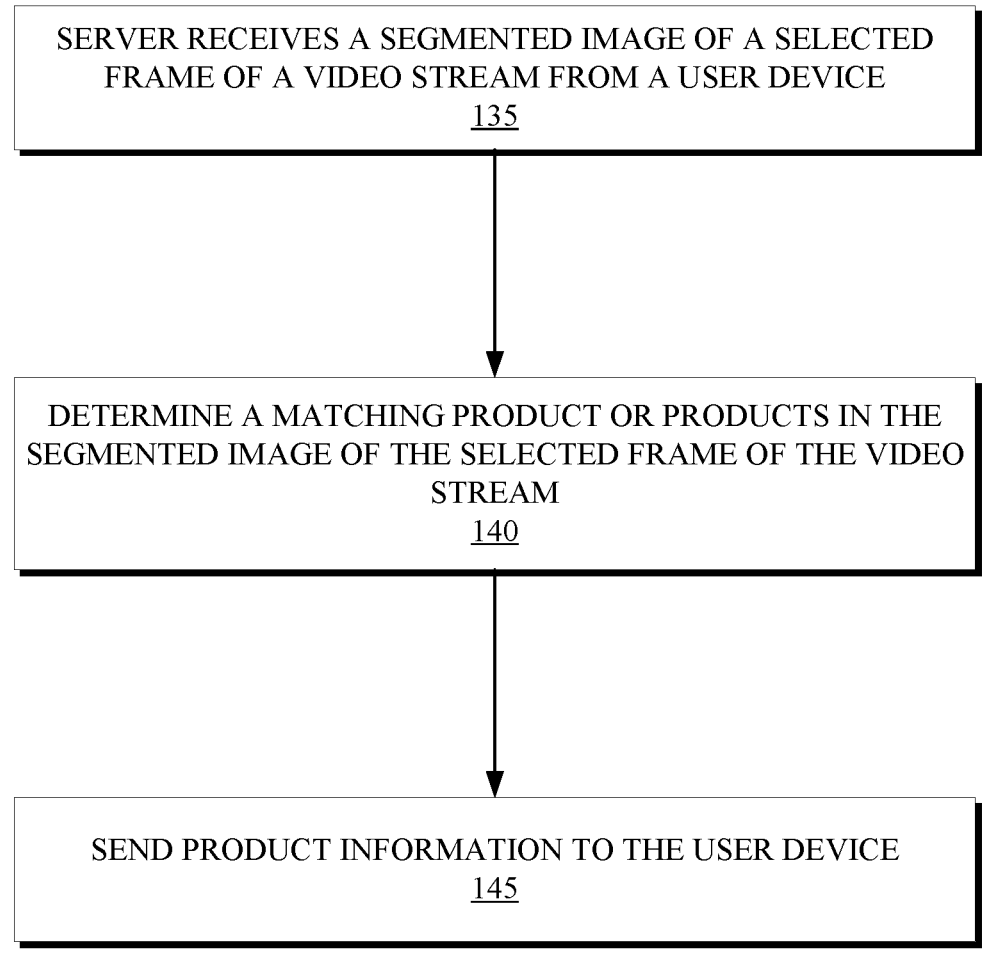
FIG. 2B is a flowchart of a method for recognizing a plurality of products within a captured image, according to an embodiment.

FIGS. 2A and 2B illustrate methods for recognizing a plurality of products within a captured image, according to an embodiment.

FIG. 2A is a flowchart of a method 100 for recognizing a plurality of products within a captured image, according to an embodiment. The method 100 generally includes receiving a captured image from a user device and determining what products are visible in the captured image. The determination of what products are visible in the captured image can be performed with greater than 95% confidence. In an embodiment, the determination can be performed in less than at or about two seconds. It will be appreciated that the timing is an example, and the actual target for timing can vary beyond this number. If the method 100 does not identify the products visible in the captured image with greater than 95% confidence, the method 100 may not provide recognized products to the user devices 15. In an embodiment, if the method 100 does not identify the products visible in the captured image with greater than 95% confidence, the server may initiate a message to the user device that enables the user to identify the product in the captured image.

At 105, a server (e.g., the server 25 in FIG. 1) receives a video stream from a user device (e.g., the user devices 15 in FIG. 1). The video stream may include a plurality of still images (frames) played in succession. In general, the electronic mobile device may have a frame rate of at or about 20 to at or about 30 frames per second (FPS). It will be appreciated that these frame rates are examples and can vary according to, for example, the particular electronic mobile device being used. The frame rate of the electronic mobile device may determine how may frames are provided to the server 25.

At 110, the server 25 selects a frame of the video stream. The frame serves as the captured image. In this manner, the consumer is able to view the one or more products via the camera device on the electronic mobile device without taking action to capture the image. Also at 110, the server segments the products included in the captured image (e.g., the selected frame) into discrete product images. The segmenting can include, for example, breaking the captured image into a series of discrete segments. In an embodiment, the segments can be, for example, rectangles or the like. In an embodiment, the selected frame can include a single frame from the video stream. In an embodiment, the selected frame can include a plurality of frames from the video stream.

Figure 3:
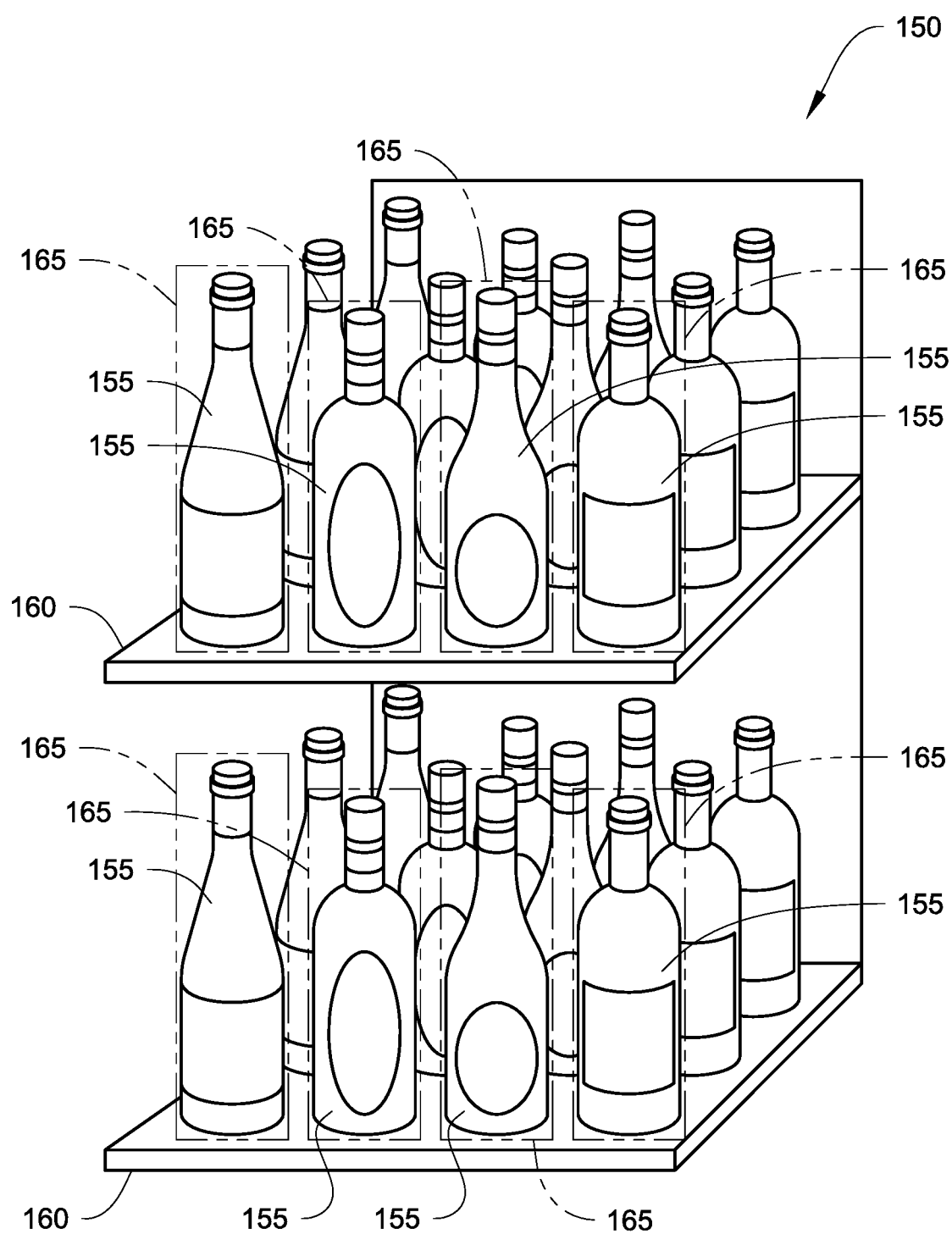
FIG. 3 is a schematic diagram of a captured image that has been segmented according to the method in FIG. 2A or FIG. 2B, according to an embodiment.

An example of a captured image that has been segmented is shown in FIG. 3. In FIG. 3, the captured image 150 shows a plurality of bottles 155 on a plurality of shelves 160. Each of the bottles 155 is shown with a rectangle (segment) 165 drawn around the bottles 155. Referring back to FIG. 2, the segmenting at 110 can be performed using various approaches to complete the segmenting. At 110, the server 25 may use an optical character recognition (OCR), an edge detection, a histogram of oriented gradients, a marker, an artificial neural network, or combinations thereof, to identify where the segments 165 should be placed. Following the segmentation at 110, image recognition can be performed on each of the plurality of segments 165 (e.g., different product images) to identify which product is in each segment.

At 115 the server determines matching products for each of the segmented images for the plurality of products in the captured image using the electronic product recognizer 60. In an embodiment, one manner of increasing the performance of the electronic product recognizer 60 is to limit the pool of possible matching products to those products sold by the retailer (e.g., only those products identified in the product database 35). Accordingly, if the consumer is imaging a product or products that are not for sale by the retailer, then the product recognizer 50 will not identify the product or products as a recognized product.

Additionally, 115 is performed for each of the segmented images from 110. The recognition for the various images can be performed concurrently to meet the processing time requirements of identifying products in less than 2 seconds. Furthermore, as will be described in accordance with FIG. 4 below, 115 includes a plurality of recognition processes that are concurrently executed. As a result, the recognition process may be a "race to the finish" in which the first recognition process to identify the product with greater than 95% confidence may be used as the recognized product.

At 120, after the recognition of the matching products in the captured image, product information from the product database 35 can be output by the server 25 to the user device 15.

FIG. 2B is a flowchart of a method 130 for recognizing a plurality of products within a captured image, according to an embodiment.

The method 130 generally includes receiving a segmented image from a user device and determining what products are visible in the segmented image. The determination of what products are visible in the captured image can be performed with greater than 95% confidence. In an embodiment, the determination can be performed in less than at or about two seconds. It will be appreciated that the timing is an example, and the actual target for timing can vary beyond this number. If the method 130 does not identify the products visible in the captured image with greater than 95% confidence, the method 130 may not provide recognized products to the user devices 15. In an embodiment, if the method 130 does not identify the products visible in the captured image with greater than 95% confidence, the server may initiate a message to the user device that enables the user to identify the product in the captured image.

At 135, a server (e.g., the server 25 in FIG. 1) receives a segmented image of a selected frame of a video stream from a user device (e.g., the user devices 15 in FIG. 1). In an embodiment, the segmenting is performed on the user device 15. As a result, the method 130 may consume less transmission bandwidth than the method 100 in FIG. 2A. In this manner, the consumer is able to view the one or more products via the camera device on the electronic mobile device without taking action to capture the image. The segmenting can include, for example, breaking the captured image into a series of discrete segments. In an embodiment, the segments can be, for example, rectangles or the like.

An example of a segmented image is shown in FIG. 3. In FIG. 3, the segmented image 150 shows a plurality of bottles 155 on a plurality of shelves 160. Each of the bottles 155 is shown with a rectangle (segment) 165 drawn around the bottles 155. Referring back to FIG. 2B, the segmenting can be performed using various approaches to complete the segmenting such as, but not limited to, an optical character recognition (OCR), an edge detection, a histogram of oriented gradients, a marker, an artificial neural network, or combinations thereof, to identify where the segments 165 should be placed. Image recognition can be performed on each of the plurality of segments 165 (e.g., different product images) to identify which product is in each segment.

At 140 the server determines matching products for each of the segmented images for the plurality of products in the segmented image using the electronic product recognizer 60. In an embodiment, one manner of increasing the performance of the electronic product recognizer 60 is to limit the pool of possible matching products to those products sold by the retailer (e.g., only those products identified in the product database 35). Accordingly, if the consumer is imaging a product or products that are not for sale by the retailer, then the electronic product recognizer 60 will not identify the product or products as a recognized product.

Additionally, 140 is performed for each of the segmented images received at 135. The recognition for the various images can be performed concurrently to meet the processing time requirements of identifying products in less than 2 seconds. Furthermore, as will be described in accordance with FIG. 4 below, 140 includes a plurality of recognition processes that are concurrently executed. As a result, the recognition process may be a "race to the finish" in which the first recognition process to identify the product with greater than 95% confidence may be used as the recognized product.

At 145, after the recognition of the matching products in the captured image, product information from the product database 35 can be output by the server 25 to the user device 15.

Figure 4:
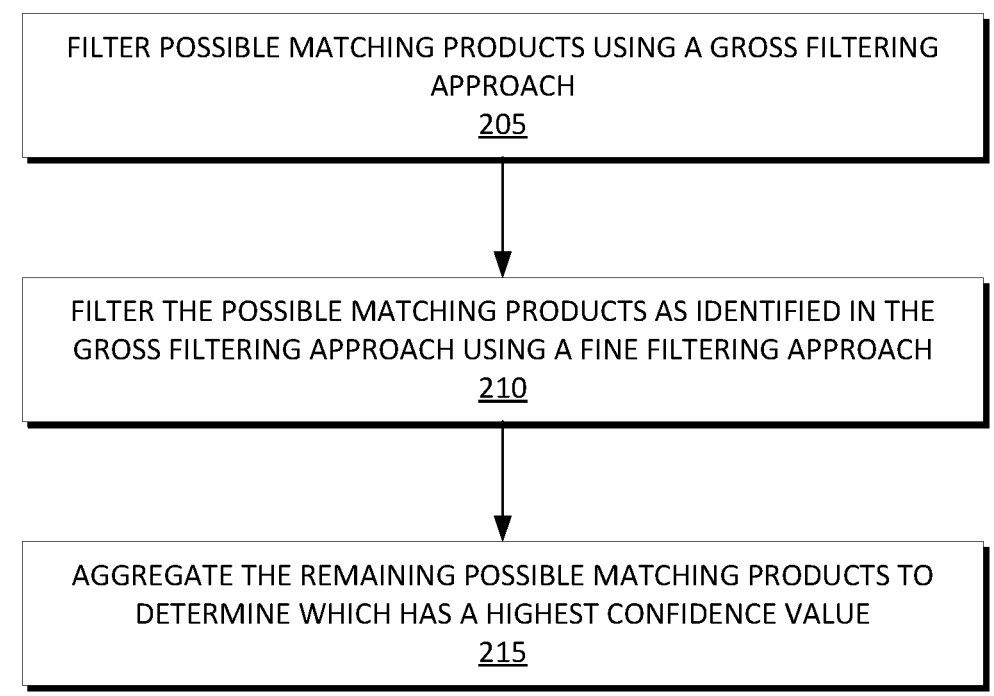
FIG. 4 is a flowchart of a method for performing image recognition, according to an embodiment.

FIG. 4 is a flowchart of a method 200 for performing image recognition, according to an embodiment. The method 200 generally corresponds to 115 in the method 100 of FIG. 2A or 140 in FIG. 2B. That is, when the method 100 is executed, at 115 the method 200 can be performed, and when the method 130 is executed, at 140, the method 200 can be performed.

The method 200 generally includes a plurality of recognition methods that are concurrently performed to result in a recognized product. In an embodiment, the method 200 can be utilized to recognize a product at greater than 95% confidence. In an embodiment, the determination can be performed in less than at or about two seconds. It will be appreciated that the timing is an example, and the actual target for timing can vary beyond this number. In an embodiment, the method 200 can include one or more processes that are performed sequentially.

At 205, a captured image of a product that was received by the electronic product recognizer 60 is filtered for possible matching products using a gross filtering approach. The gross filtering approach can, for example, reduce a number of possible products to less than 10% of the initial possible products. For example, if the product database 35 includes 10,000 products, the gross filtering approach at 205 can reduce a number of possible products to less than 1,000 products. It will be appreciated that these numbers are examples, and the number of possible products and products following the gross filtering approach at 205 can vary beyond the stated values in accordance with the principles in this disclosure.

The gross filtering approach can rely on a plurality of image recognition methods to reduce a number of possible products in the captured image. For example, in an embodiment, the gross filtering approach can include a location determination for the electronic mobile device. The location determination can include several considerations. In an embodiment, the location determination can take into account coordinates from a global positioning system (GPS) sensor on the electronic mobile device. The current GPS information can be included in the determination, as well as GPS information identifying a path by which the consumer arrived at the current location. The current GPS information, the path of the consumer, and a planogram of the retail store can be used to make an estimated determination of what the consumer should have in her field of view. In an embodiment, the GPS information can be combined with, or alternatively replaced by, location information from an in-store positioning system (IPS). The gross filtering can also include a consideration of whether a logo or brand identifier on the product image can be identified. Utilizing these approaches in combination, the possible products can be reduced to a more manageable number of possible products.

At 210, the electronic product recognizer 60 performs a fine filtering on the possible products identified from the gross filtering at 205. The fine filtering approach can, for example, reduce a number of possible products to less than 2% of the initial possible products. Continuing with the example above, if the product database 35 includes 10,000 products, the fine filtering approach at 210 can reduce a number of possible products to less than 200 products. It will be appreciated that these numbers are examples, and the number of possible products and products following the fine filtering approach at 210 can vary beyond the stated values in accordance with the principles in this disclosure.

The fine filtering approach can rely on a variety of approaches for reducing a number of possible products. In the fine filtering approach, the electronic product recognizer 60 can additionally utilize a marker associated with a brand, can determine whether there are any identifying features on an edge of the shelf (e.g., product identifiers, etc.), a color of the product, OCR, and combinations thereof. The user path may be utilized in 210 in addition to 205 to further reduce the possible product images.

At 215 the electronic product recognizer 60 selects a match from the pool of products identified in the fine filtering approach at 210. If a match cannot be determined from the pool of products identified in the fine filtering approach, then the method 200 may end without selecting a match. At 215, the determination can be based on the color of the product in the image, OCR for text in the image, and markers associated with the item, along with suitable combinations thereof. In an embodiment, a tie can be broken randomly. In another embodiment, a tie can be broken using a selected fine filtering approach.

Figure 5:
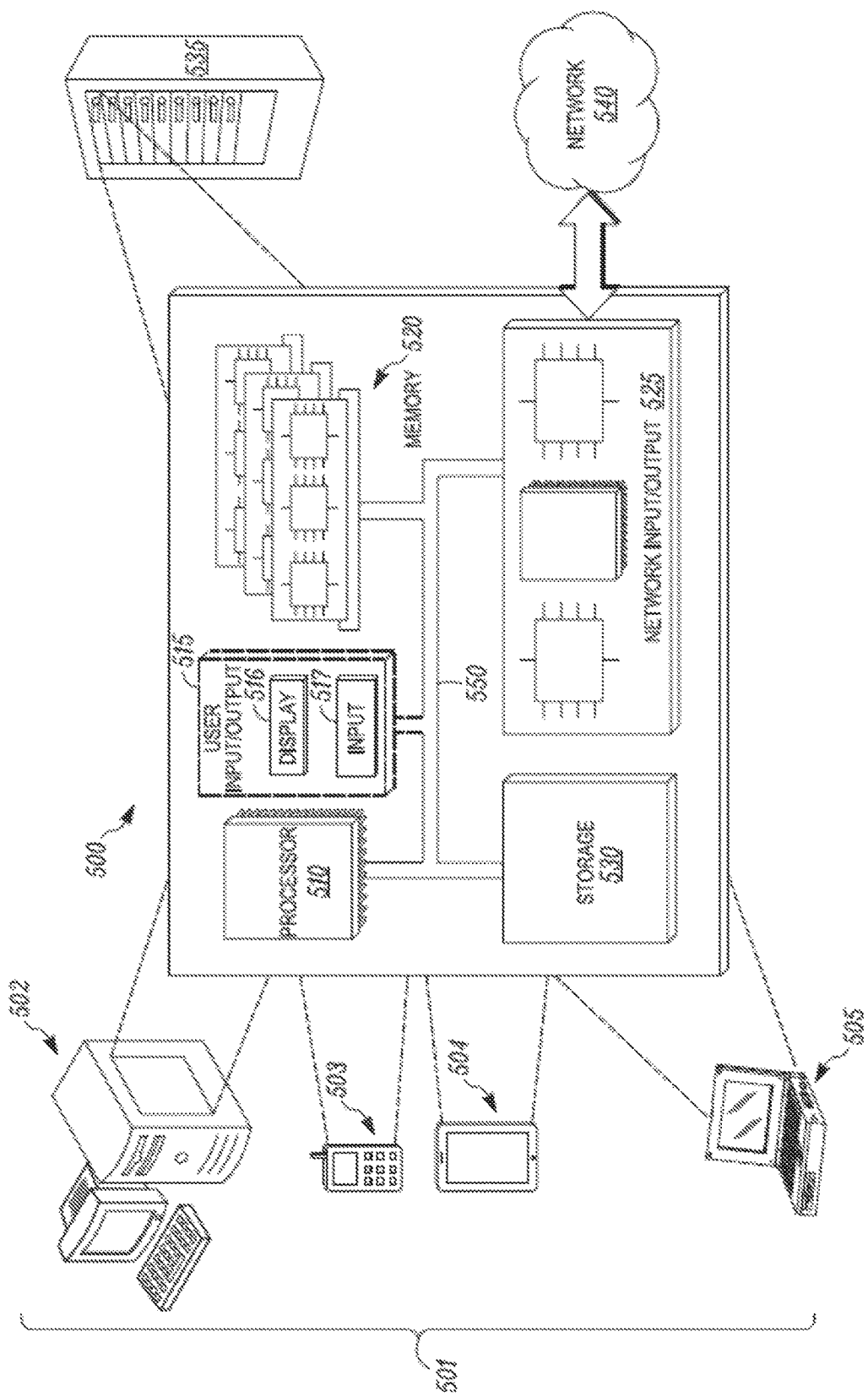
FIG. 5 is a schematic diagram of architecture for a computer device, according to an embodiment.

FIG. 5 is a schematic diagram of architecture for a computer device 500, according to an embodiment. The computer device 500 and any of the individual components thereof can be used for any of the operations described in accordance with any of the computer-implemented methods described herein.

The computer device 500 generally includes a processor 510, memory 520, a network input/output (I/O) 525, storage 530, and an interconnect 550. The computer device 500 can optionally include a user I/O 515, according to some embodiments. The computer device 500 can be in communication with one or more additional computer devices 500 through a network 540.

The computer device 500 is generally representative of hardware aspects of a variety of user devices 501 and a server device 535. The illustrated user devices 501 are examples and are not intended to be limiting. Examples of the user devices 501 include, but are not limited to, a desktop computer 502, a cellular/mobile phone 503, a tablet device 504, and a laptop computer 505. It is to be appreciated that the user devices 501 can include other devices such as, but not limited to, a wearable device, a personal digital assistant (PDA), a video game console, a television, or the like. In an embodiment, the user devices 501 can alternatively be referred to as client devices 501. In such an embodiment, the client devices 501 can be in communication with the server device 535 through the network 540. One or more of the client devices 501 can be in communication with another of the client devices 501 through the network 540 in an embodiment.

The processor 510 can retrieve and execute programming instructions stored in the memory 520 and/or the storage 530. The processor 510 can also store and retrieve application data residing in the memory 520. The interconnect 550 is used to transmit programming instructions and/or application data between the processor 510, the user I/O 515, the memory 520, the storage 530, and the network I/O 540. The interconnect 550 can be, for example, one or more busses or the like. The processor 510 can be a single processor, multiple processors, or a single processor having multiple processing cores. In some embodiments, the processor 510 can be a single-threaded processor. In an embodiment, the processor 510 can be a multi-threaded processor.

The user I/O 515 can include a display 516 and/or an input 517, according to an embodiment. It is to be appreciated that the user I/O 515 can be one or more devices connected in communication with the computer device 500 that are physically separate from the computer device 500. For example, the display 516 and input 517 for the desktop computer 502 can be connected in communication but be physically separate from the computer device 500. In some embodiments, the display 516 and input 517 can be physically included with the computer device 500 for the desktop computer 502. In an embodiment, the user I/O 515 can physically be part of the user device 501. For example, the cellular/mobile phone 503, the tablet device 504, and the laptop 505 include the display 516 and input 517 that are part of the computer device 500. The server device 535 generally may not include the user I/O 515. In an embodiment, the server device 535 can be connected to the display 516 and input 517.

The display 516 can include any of a variety of display devices suitable for displaying information to the user. Examples of devices suitable for the display 516 include, but are not limited to, a cathode ray tube (CRT) monitor, a liquid crystal display (LCD) monitor, a light emitting diode (LED) monitor, or the like.

The input 517 can include any of a variety of input devices or input means suitable for receiving an input from the user. Examples of devices suitable for the input 517 include, but are not limited to, a keyboard, a mouse, a trackball, a button, a voice command, a proximity sensor, an ocular sensing device for determining an input based on eye movements (e.g., scrolling based on an eye movement), or the like. It is to be appreciated that combinations of the foregoing inputs 517 can be included for the user devices 501. In some embodiments the input 517 can be integrated with the display 516 such that both input and output are performed by the display 516.

The memory 520 is generally included to be representative of a random access memory such as, but not limited to, Static Random Access Memory (SRAM), Dynamic Random Access Memory (DRAM), or Flash. In some embodiments, the memory 520 can be a volatile memory. In some embodiments, the memory 520 can be a non-volatile memory. In some embodiments, at least a portion of the memory can be virtual memory.

The storage 530 is generally included to be representative of a non-volatile memory such as, but not limited to, a hard disk drive, a solid state device, removable memory cards, optical storage, flash memory devices, network attached storage (NAS), or connections to storage area network (SAN) devices, or other similar devices that may store non-volatile data. In some embodiments, the storage 530 is a computer readable medium. In some embodiments, the storage 530 can include storage that is external to the computer device 500, such as in a cloud.

The network I/O 525 is configured to transmit data via a network 540. The network 540 may alternatively be referred to as the communications network 540. Examples of the network 540 include, but are not limited to, a local area network (LAN), a wide area network (WAN), the Internet, or the like. In some embodiments, the network I/O 525 can transmit data via the network 540 through a wireless connection using Wi-Fi, Bluetooth, or other similar wireless communication protocols. In some embodiments, the computer device 500 can transmit data via the network 540 through a cellular, 3G, 4G, or other wireless protocol. In some embodiments, the network I/O 525 can transmit data via a wire line, an optical fiber cable, or the like. It is to be appreciated that the network I/O 525 can communicate through the network 540 through suitable combinations of the preceding wired and wireless communication methods.

The server device 535 is generally representative of a computer device 500 that can, for example, respond to requests received via the network 540 to provide, for example, data for rendering a website on the user devices 501. The server 535 can be representative of a data server, an application server, an Internet server, or the like.

Aspects described herein can be embodied as a system, method, or a computer readable medium. In some embodiments, the aspects described can be implemented in hardware, software (including firmware or the like), or combinations thereof. Some aspects can be implemented in a non-transitory, tangible computer readable medium, including computer readable instructions for execution by a processor. Any combination of one or more computer readable medium(s) can be used.

The computer readable medium can include a computer readable signal medium and/or a computer readable storage medium. A computer readable storage medium can include any tangible medium capable of storing a computer program for use by a programmable processor to perform functions described herein by operating on input data and generating an output. A computer program is a set of instructions that can be used, directly or indirectly, in a computer system to perform a certain function or determine a certain result. Examples of computer readable storage media include, but are not limited to, a floppy disk; a hard disk; a random access memory (RAM); a read-only memory (ROM); a semiconductor memory device such as, but not limited to, an erasable programmable read-only memory (EPROM), an electrically erasable programmable read-only memory (EEPROM), Flash memory, or the like; a portable compact disk read-only memory (CD-ROM); an optical storage device; a magnetic storage device; other similar device; or suitable combinations of the foregoing. A computer readable signal medium can include a propagated data signal having computer readable instructions. Examples of propagated signals include, but are not limited to, an optical propagated signal, an electro-magnetic propagated signal, or the like. A computer readable signal medium can include any computer readable medium that is not a computer readable storage medium that can propagate a computer program for use by a programmable processor to perform functions described herein by operating on input data and generating an output.

An embodiment can be provided to an end-user through a cloud-computing infrastructure. Cloud computing generally includes the provision of scalable computing resources as a service over a network (e.g., the Internet or the like).

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A system, comprising:
a server having a processor and a memory, wherein the server is separate from an electronic mobile device;
a communication network; and
a database in electronic communication with the server via the communication network,
wherein the server includes an electronic product recognizer that:
receives, via the communication network, a segmented image from the electronic mobile device that is physically located at a retail store, the segmented image including a plurality of products and including a plurality of segments, wherein the segmented image is created by the electronic mobile device using a captured image from a camera of the electronic mobile device, the captured image including the plurality of products, and wherein the segmented image is created by the electronic mobile device by drawing a separate segment from the plurality of segments around each of the plurality of products;
performs an image recognition of the segmented image, which includes the separate segment drawn around each of the plurality of products, using each of the plurality of segments to identify one of the plurality of products in each of the plurality of segments; and
outputs one or more recognized products identified in the image recognition to the electronic mobile device,
wherein the server is configured to perform the image recognition of the segmented image by applying a gross filtering approach and a fine filtering approach.

2. The system of claim 1, wherein the server is stored on premises of the retail store.

3. The system of claim 1, wherein the electronic product recognizer performs the image recognition in less than 2 seconds.

4. The system of claim 1, further comprising the retail store, wherein the server is stored on premises of the retail store, and the communication network is a local area network of the retail store.

5. The system of claim 1, wherein the electronic product recognizer performs the image recognition with a greater than 95% confidence.

6. The system of claim 1, wherein the gross filtering approach uses coordinates from a GPS sensor indicating a current location of a consumer on the electronic mobile device and GPS information that includes a path by which the consumer arrived at the current location, and a planogram of the retail store.

7. The system of claim 1, wherein the electronic product recognizer is configured to identify at least one potential match from a pool of products identified in the fine filtering approach to obtain a first recognized product of the recognized products, and wherein, upon the electronic product recognizer identifying two or more potential matches from a pool of products identified in the fine filtering approach, the electronic product recognizer randomly selecting a first recognized product from the plurality of recognized products.

8. The system of claim 1, wherein the segmented image received from the electronic product recognizer is a selected frame of a video stream from the camera of the electronic mobile device, and
wherein the electronic product recognizer is configured to:
receive a plurality of segmented images from the electronic mobile device corresponding to multiple frames of the video stream;
perform the image recognition for each of the plurality of segmented images; and
output the two or more recognized products identified in the image recognition for each of the plurality of segmented images.

9. A computer-implemented method to electronically recognize a product in an electronic image captured via an electronic mobile device, the method comprising:
receiving, by a server via a communication network, a segmented image from a camera of the electronic mobile device that is physically located at a retail store, the segmented image including a plurality of products and including a plurality of segments, wherein the segmented image is created by the electronic mobile device using a captured image from the camera of the electronic mobile device, the captured image including the plurality of products, and wherein the segmented image is created by the electronic mobile device by drawing a separate segment from the plurality of segments around each of the plurality of products;
an electronic product recognizer of the server performing an image recognition of the segmented image, which includes the separate segment drawn around each of the plurality of products, using each of the plurality of segments to identify one of the plurality of products in each of the plurality of segments; and
the electronic product recognizer outputting, from the server, one or more recognized products identified in the image recognition to the electronic mobile device,
wherein the performing the image recognition includes applying a gross filtering approach and a fine filtering approach, and
wherein the server is separate from the electronic mobile device.

10. The computer-implemented method of claim 9, wherein the gross filtering approach includes one or more of a location determination, a logo determination, and a brand determination.

11. The computer-implemented method of claim 10, wherein the location determination includes determination of a current location based on a global positioning system (GPS) sensor on the electronic mobile device, a previous location based on the GPS sensor on the electronic mobile device, an in-store positioning system (IPS), and a planogram of the retail store.

12. The computer-implemented method of claim 9, wherein the fine filtering approach includes one or more of a shelf edge determination, a user path determination, an OCR, a brand marker determination, and a color determination.

13. The computer-implemented method of claim 9, further comprising selecting a match from a pool of possible products determined from the products identified in the fine filtering approach.

14. The computer-implemented method of claim 13, wherein selecting the match includes OCR and determination of an item marker.

15. The computer-implemented method of claim 9, wherein the method is completed in less than at or about 2 seconds.

16. The computer-implemented method of claim 9, wherein the method has a confidence greater than at or about 95%.

17. The computer-implemented method of claim 9, wherein the gross filtering approach uses coordinates from a GPS sensor indicating a current location of a consumer on the electronic mobile device and GPS information that includes a path by which the consumer arrived at the current location, and a planogram of the retail store.

18. The computer implemented method of claim 9, wherein applying the fine filtering approach includes:

the electronic product recognizer identifying at least one potential match from a pool of products identified in the fine filtering approach to obtain a first recognized product of the recognized products, and upon the electronic product recognizer identifying two or more potential matches from a pool of products identified in the fine filtering approach, the electronic product recognizer randomly selecting a first recognized product from the plurality of recognized products.

19. The computer-implemented method of claim 9, wherein the segmented image received from the electronic product recognizer is a selected frame of a video stream from the camera of the electronic mobile device, the method further comprising:

the electronic product recognizer receiving a plurality of segmented images from the electronic mobile device corresponding to multiple frames of the video stream;

the electronic product recognizer performing the image recognition for each of the plurality of segmented images; and the electronic product recognizer outputting the two or more recognized products identified in the image recognition for each of the plurality of segmented images.

* * * * *